US007045480B2

(12) United States Patent
Te Nijenhuis et al.

(10) Patent No.: US 7,045,480 B2
(45) Date of Patent: May 16, 2006

(54) TREATMENT OF A TITANIUM TETRACHLORIDE-CONTAINING WASTE STREAM

(75) Inventors: Marcellinus Antonius Maria Te Nijenhuis, Warnsveld (NL); Erik Antonius Jacobus Wilhelmus Kuppen, Gorssel (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/505,582

(22) PCT Filed: Feb. 28, 2003

(86) PCT No.: PCT/EP03/02052

§ 371 (c)(1),
(2), (4) Date: Dec. 7, 2004

(87) PCT Pub. No.: WO03/074425

PCT Pub. Date: Sep. 12, 2003

(65) Prior Publication Data

US 2005/0084433 A1 Apr. 21, 2005

(30) Foreign Application Priority Data

Mar. 4, 2002 (EP) ................................. 02075871

(51) Int. Cl.
*B01J 31/00* (2006.01)
(52) U.S. Cl. ........................................ 502/150; 426/69
(58) Field of Classification Search ................. 502/150; 423/69
See application file for complete search history.

(56) References Cited

U.S. PATENT DOCUMENTS

| 2,754,256 | A |   | 7/1956 | Stambaugh |   |
| 3,993,588 | A |   | 11/1976 | Thukral |   |
| 4,115,319 | A |   | 9/1978 | Scata et al. |   |
| 4,452,912 | A |   | 6/1984 | Bahadir et al. |   |
| 4,468,477 | A |   | 8/1984 | Caunt et al. |   |
| 4,683,215 | A |   | 7/1987 | Bilhou et al. |   |
| 4,727,051 | A |   | 2/1988 | Breen et al. |   |
| 4,876,321 | A |   | 10/1989 | Lo et al. |   |
| 4,914,257 | A |   | 4/1990 | Cohen et al. |   |
| 4,981,826 | A |   | 1/1991 | Speca |   |
| 5,061,666 | A | * | 10/1991 | Chadwick et al. | 502/107 |
| 5,132,379 | A | * | 7/1992 | Chadwick et al. | 526/123.1 |
| 5,221,650 | A |   | 6/1993 | Buehler |   |
| 5,242,549 | A |   | 9/1993 | Potter et al. |   |
| 5,420,090 | A |   | 5/1995 | Spencer et al. |   |
| 5,866,750 | A | * | 2/1999 | Tomaskovic et al. | 585/853 |
| 5,948,212 | A | * | 9/1999 | Kilty et al. | 203/29 |
| 6,358,372 | B1 | * | 3/2002 | Zum Mallen | 203/6 |
| 6,419,837 | B1 | * | 7/2002 | Akse | 210/752 |
| 6,429,278 | B1 | * | 8/2002 | Howell et al. | 528/307 |
| 6,800,260 | B1 | * | 10/2004 | Carter et al. | 423/140 |

FOREIGN PATENT DOCUMENTS

| EP | 0 343 901 A2 | 11/1989 |   |
| EP | 0 491 566 A2 | 6/1992 |   |
| EP | 0 700 936 A1 | 3/1996 |   |
| EP | 0 717 052 A1 | 6/1996 |   |
| EP | 0 743 326 A1 | 11/1996 |   |
| EP | 0 771 776 B1 | 5/1997 |   |
| JP | A 2001-261340 | 9/2001 |   |
| WO | WO 97/36939 | 10/1997 |   |
| WO | WO 03074425 A1 | * | 12/2003 |

* cited by examiner

*Primary Examiner*—J. A. Lorengo
*Assistant Examiner*—Jennine Brown
(74) *Attorney, Agent, or Firm*—Oliff & Berridge, PLC

(57) ABSTRACT

The invention relates to a process to increase the amount of $TiCl_4$ that is retrieved from a waste stream comprising one or more titanium (halo) (alk) oxides while also reducing the quantity and/or hazard of the resulting waste. Valuable solvents/diluents and/or alkyl halides that are introduced into or formed during the process can also be retrieved. The so obtained $TiCl_4$, solvents/diluents and/or alkyl halides are recyclable to, for instance, the process to make Ziegler-Natta catalysts and or co-catalysts.

13 Claims, No Drawings

TREATMENT OF A TITANIUM TETRACHLORIDE-CONTAINING WASTE STREAM

The invention relates to a process allowing the recycle of valuable chemicals from a waste stream, to reduce the amount of waste, and/or to reduce the hazards associated with the final waste. The said waste stream is generated during the manufacture of Ti-based catalysts and typically comprises said waste, said valuable chemicals, as well as further materials, such as alkoxylated and/or alcohol-containing species. The Ti-based catalysts find widespread use in the Ziegler-Natta (co) polymerisation process of olefins.

The process to make Ti-based Ziegler-Natta catalysts for olefin polymerisations is long known. Presently, most polypropylene is being manufactured with such a type of catalyst. Examples of patents disclosing processes to make and use the Ti-based catalysts include U.S. Pat. Nos. 3,993,588, 4,115,319, 4,452,912, 4,468,477, 4,727,051, 4,876,321, 4,981,826, 5,221,650, 5,420,090, EP-A-0 491 566, EP-A-0 700 936, EP-A-0 717 052, EP-A-0 743 326, and WO 97/36939. Typically, such processes generate a large waste stream containing, inter alia, unreacted $TiCl_4$, optionally conventional electron-donors, such as aromatic and/or aliphatic (di)esters, (di)ethers, etc., optional (co)solvents, such as aromatic hydrocarbons, e.g. xylene and/or toluene, chlorinated (co)solvents, such as chloroalkanes and monochlorobenzene, ethers, such as THF or dibutylether, and/or alkanes, such as heptane, and one or more titanium (halo) alkoxides of the formula $TiX_x(OR)_z$ wherein X is halogen, R is alkyl, mostly lower alkyl with 1 to 10 carbon atoms, such as ethyl, isobutyl, octyl, isononyl, etc., x=0–3, z=1–4, and $2 \leq x+z \leq 4$, preferably x+z is 3, or 4, most preferably, x+z is 4, the molecule being neutral in charge. For environmental reasons and in order to allow a more economical production of the catalyst, it is desirable to recycle various chemicals of the waste stream. The chemicals are preferably retrieved in sufficient purity to allow their re-use. Furthermore, the conventional waste stream is hazardous and difficult to handle since the $TiCl_4$ therein will generate the very corrosive HCl gas upon contact with water. Accordingly, there has been great interest in recovering valuable chemicals from the waste stream and to treat the waste stream such that a less hazardous waste product is obtained.

Conventionally, the waste stream has been treated by distillation while preventing the formation of solids as much as possible. More specifically, U.S. Pat. No. 5,242,549 discloses to add a separation solvent to the mixture and to conduct a first distillation such that, inter alia, $TiCl_4$ can be recycled. The separation solvent must have an atmospheric boiling point higher than that of $TiCl_4$ and lower than the lowest boiling of the titanium chloro (alk) oxides. The separation solvent is recovered in a second distillation unit and recycled to the first distillation unit. The temperature in this second distillation step is such that, inter alia, the titanium chloro (alk) oxides remain dissolved in the bottoms and are subsequently disposed of. In these types of processes the temperature of the second distillation unit is always to be selected thus that the separation solvent is recovered while the titanium chloro alkoxides remain dissolved and wherein the formation of solids and alkyl halide is prevented. Therefore, temperatures are preferably as low as possible.

Also the hydrolysis of Ti/V-containing hydrocarbons has been reported. EP-B-0 771 776 discloses an improvement of the process of U.S. Pat. No. 5,242,549. Herein the stream of titanium (halo) (alk) oxides and separation solvent is subjected to a further aqueous base or acidic solution hydrolysis step. In the hydrolysis step the titanium compounds are removed from the waste stream by precipitation.

U.S. Pat. No. 5,948,212 discloses a process wherein an additional separation solvent is not used. However, in this instance, it is required that a reaction diluent is used in the catalyst manufacturing steps that, again, has a boiling point intermediate to the boiling point of the $TiCl_4$ and the titanium (halo) alkoxides, esters and complexes thereof. In a first distillation step the $TiCl_4$ is recovered, while the reaction diluent is retrieved from the top of the second distillation unit. The titanium (halo) alkoxides, esters and complexes thereof are the bottoms of the second distillation unit. This waste may contain some of the diluent to prevent the formation of solids.

U.S. Pat. No. 4,683,215 discloses to react an organic acid halide, such as benzoyl chloride, with titanium chloro (alk) oxides in order to remove said titanium chloro alkoxide contaminants from a $TiCl_4$ comprising stream. This process is considered not to be economically feasible, and preferred processes according to the invention do not involve the use of organic acid chlorides.

U.S. Pat. No. 4,914,257 discloses a process wherein a $TiCl_4$/THF complex is precipitated from a waste stream, allowing the recovery of toluene and $TiCl_4$ or THF from it. Depending on the composition of the waste stream, THF or $TiCl_4$ is added to form the complex that precipitates and is subsequently removed.

There are other references disclosing processes wherein the waste stream is first contacted with water for hydrolysis and subsequently treated further, as in for instance, JP-A-2001-261340. It is noted that the processes according to the present invention do not comprise a hydrolysis step prior to the thermal treatment step.

In all these processes, it typically is required to use very specific diluents/solvents or to add further chemicals to the waste stream to assist in the separation of one or more of its components. Furthermore, it was observed that not the maximum possible amount of $TiCl_4$ is obtained and/or recycled from the waste stream. Although thus one or more chemicals are retrieved, the burden on the environment (i.e. the amount of final waste), the cost, and the hazards associated with the resulting final waste are still a great concern and the flexibility of the choice of solvent in the catalyst preparation process is limited.

After extensive research efforts, we found a new process to treat the waste such that i) a significantly increased amount of valuable raw materials are retrieved, which may be recycled into one or more conventional processes, ii) the amount of waste is decreased, iii) the hazard of the remaining waste is greatly reduced, iv) allows great flexibility in the catalyst preparation process, e.g. because no separation and/or co-solvents are required, and v) obviate the need to add chemicals to the waste stream.

Accordingly, we claim a new process to treat a waste stream from a process to make Ti-based Ziegler-Natta catalyst comprising unreacted $TiCl_4$ and one or more titanium (halo) alkoxides of the formula $TiX_x(OR)_z$ wherein X is halogen, R is alkyl, preferably lower alkyl with 1 to 10 carbon atoms, x=0–3, z=1–4, and $2 \leq x+z \leq 4$, the molecule being neutral in charge. More preferably R is selected from the group consisting of ethyl, n-propyl, isopropyl, n-butyl, sec-butyl, isobutyl, tert-butyl, n-amyl, isoamyl, tert-amyl, and sec-isoamyl. Most preferably, R is a primary alkyl group. Preferably, X is chlorine, bromine, or fluorine, chlorine being most preferred.

The new process is characterised in that it comprises a thermal treatment step wherein the process conditions are chosen such that the residue from the thermal treatment step is particulate matter, such as solid, porous, and/or hollow (filled, e.g. with liquid) particles, chunks, lumps, agglomerates, granules, chips, prills, flakes, etc., which may still contain absorbed and/or adsorbed liquid at a temperature of 20° C., preferably at a temperature of 90° C., most preferably at the thermal treatment temperature. Most preferably it is a free flowing powder at these temperatures. The particle size of the particulate matter of the preferred embodiment is not essential for the present invention. Preferably, the particle size ranges from 0.1 μm to 10 cm, more preferably from 0.2 μm to 4 cm, in order to facilitate handling.

It is noted that, depending on specific requirements, e.g. recycle specifications and/or local waste regulations, that the final waste be further treated using any one or more of the following processing steps, in random order, to optimise results. i) Neutralisation and/or hydrolysis in a subsequent conventional treatment, e.g. with (aqueous) (earth) alkali (hydr)oxide, ii) conventional oxidation, e.g. with air at elevated temperatures, to oxidise (organic) compounds, if conditions are chosen properly, the only residual Ti compound is then $TiO_2$, iii) incorporation of the waste into a solid, preferably inorganic, matrix, such as glass, by conventional encapsulation techniques, melt and/or sintering techniques, iv) pyrolysis of organic compounds in a conventional way, v) pyrohydrolysis, a thermal treatment in presence of water and absence of oxygen, vi) mixing with other waste materials, vii) recycling of the solid waste product to a process wherein the waste can serve as a source of Ti, such as processes wherein Ti-salts and/or oxides are produced, and viii) dilution/combination with an appropriate diluent/agglomeration-aid, e.g. to form solutions, suspensions, slurries, pastes, agglomerates, and/or other particulate matter, such as pellets, prills, and the like. If so desired, each of the further treatment steps can be performed in one or more subsequent reaction vessels. However, if convenient, also one and the same reactor can be used for the whole process.

It is noted that the final waste obtained according to the process of the present invention comprising a thermal treatment step and, optionally, a further treatment step, can still contain a certain amount of one or more conventional (complexed) electron donors or other valuable compounds, which were originally present in the waste stream before the thermal treatment step. These compounds can be recovered by various conventional techniques known in the art, such as for example hydrolysis or extraction.

In another preferred embodiment, the conditions are chosen such that essentially all $TiCl_4$ that can be formed from the waste is indeed generated and recovered. Essentially all $TiCl_4$ is formed if less than 10% w/w, preferably less than 5% w/w, more preferably less than 1% w/w of $TiCl_4$ is released from the residue when treated at 200° C. for 1 hour at atmospheric pressure.

In a further preferred embodiment, the thermal treatment is such that titanium (halo) alkoxides are decomposed under formation of a substantial amount of alkyl halide and Ti (halo) oxides. A substantial amount of alkyl halide is formed if at least 10 kg of alkyl halide is formed per 1000 kg of Ti halo alkoxide in the feed. More preferably, at least 25 kg, even more preferably at least 50 kg and most preferably at least 75 kg of alkyl halide is formed per 1000 kg of Ti halo alkoxide in the feed.

It is noted that the new process as further described and elucidated herein is of the batch-type process. However, with the information presented herein the skilled person in the art will have no difficulty extending the technology to a continuously operated process. Hence, it is to be understood that the present invention is not limited to the preferred batch process as described hereinafter.

To more precisely point out the difference with the processes of the prior art, it is noted that the conventional distillation conditions are so mild that the titanium (halo) alkoxides do not completely decompose. One of the reasons to select such mild conditions is that decomposition of titanium (halo) alkoxides results in the formation of solids and alkyl halide, which was undesired for several reasons. Probably the most important reason was blocking of the distillation unit by the solids. Such blocking by solids is known to happen in conventional distillation columns, stills, and reboilers, causing many problems. Also, the waste stream will typically comprise the product alkyl halide (RX) and the decomposition products thereof. Particularly if R is ethyl, the flash point of the waste stream is then often below regulatory limits, requiring it to be labelled "liquid, flammable", with all associated safety requirements. In a preferred embodiment of the present invention, the alkyl halide is recovered from the present process as a separate stream.

Preferably, the present process results in a final waste material, which is not as hazardous as the conventional waste material. Not only is the new waste emitting less HCl vapours when exposed to moist air (at 20° C.), it also preferably has a flash point well over regulatory limits requiring it to be labelled "liquid, flammable" (presently for products with a flashpoint of 60.5° C. or lower), which is in sharp contrast to much of the conventional waste. Hence, the final waste of the present process is not as hazardous as conventional waste, with all the associated advantages. In a preferred embodiment, the flash point of the final waste is more than 60.5° C., more preferably more than 80° C., even more preferably more than 100° C., most preferably more than 120° C.

The present thermal treatment process is preferably at least partially conducted at temperatures of 160° C. or higher at atmospheric pressure. In a more preferred embodiment, the process involves a step at atmospheric pressure and a temperature above 180° C., more preferably above 185° C. A higher temperature, such as at least 200° C. may be preferred if also $TiOCl_2$, which may be formed during the thermal treatment step, is also to be converted to $TiCl_4$. Preferably, the thermal treatment temperature is below 400° C. for economic reasons. If the thermal treatment is conducted at a reduced pressure, the temperature can be lowered accordingly, as is known in the art. In the process according to the invention, it is not preferred to work under reduced pressures and the correspondingly lower temperatures. Not only will the formation rate of $TiCl_4$ be lower, requiring longer treatment times before essentially all $TiCl_4$ is formed and retrieved, the reduced pressure is also a potential safety hazard, since any leak of the equipment will allow (humid) air to enter into the system, which will lead to the formation of the corrosive and highly undesired HCl within it.

The equipment that is used to conduct the thermal treatment step can be selected from a wide range of conventional installations that are able to withstand the chemicals used at the temperatures indicated. Preferably, the equipment is such that the (final) waste is stirred or otherwise kept in motion, to facilitate the transition from the liquid to the solid state and to ensure an efficient heat-transfer. Suitable equipment includes conventional stirred reactors equipped with a condenser and bottom outlet, such as appropriate stirred stills, but can also be in the form of conventional drying equipment, such as rotary dryers, agitated dryers, fluidised beds, flash dryers, wiped and/or falling film evaporators, and the like. Depending on the actual process it can be preferred to use equipment that is either batch-type or allows a continuous operation.

Optionally, the process will contain at least one conventional distillation unit and a thermal treatment section. In such a process (part of) the condensate from the thermal treatment reaction may be recycled into said distillation unit. However, in its most simple form, the present process involves just one thermal treatment step to treat a waste stream comprising $TiCl_4$ and one or more titanium (halide) alkoxides, whereby:

the equipment and conditions are such that essentially all $TiCl_4$ that can be retrieved by a thermal treatment is indeed recovered, after and/or during said thermal treatment it is possible to remove solids from the equipment, and the reaction mixture and the resulting final waste, is preferably stirred.

Depending on the composition of the incoming waste stream the $TiCl_4$ that is formed, as well as the $TiCl_4$ that may have been present in the incoming stream, may be recycled as such. If the incoming stream also contained one or more solvents/diluents/contaminants that boil under the applied conditions, also these solvents/diluents/contaminants can be recycled, if desired, together with the $TiCl_4$ or, after further optional separation steps, as separate streams. The resulting final titanium (halo) oxide-containing waste stream is preferably a less hazardous waste stream. If by-products are formed in the present process, which prevent the recycle of the $TiCl_4$ or the $TiCl_4$/solvent/diluent stream, a further separation step is preferred.

We observed the following beneficial (side) effects in the process according to the invention when an optional ester-type electron-donor is present in the waste stream to be treated: 1) any ester in the feed may decompose to its corresponding acid and alkyl halide, increasing the amount of potentially re-useable alkyl halide, and 2) complexes of such esters with Ti-compounds are decomposed as well, increasing the amount of $TiCl_4$ that can be recycled. Therefore, the present invention is pre-eminently suited to treat waste streams from processes to make Ziegler-Natta-type catalysts.

The final waste, at the end of the thermal treatment step is a particulate material. Preferably said particulate material is free flowing at a temperature of 20° C., preferably at a temperature of 90° C. This means that essentially all liquid solvents/diluents of the incoming waste stream have been recycled in the process. Since the preferred final titanium (halo) oxide-containing waste is essentially non-hazardous it may, optionally after any one or more of the optional steps i–viii as presented above, and depending on the regulations, be disposed of by any suitable means. Because of the now much lower hazard classification of the waste substantial economic and handling benefits result.

The amount of $TiCl_4$ that can actually be retrieved from the process will depend on the composition of the feed and will, in view of the many different processes to make the Ti-based catalyst, vary over a wide range. Similarly, the amount of alkyl halide that will be obtained, the amount of solvent that is recycled in the process, and the amount of finally resulting Ti (halo) oxide waste will vary, depending on the conditions applied in the present process.

The invention is elucidated by the following examples.

EXAMPLE 1 AND COMPARATIVE EXAMPLE A

The procedure of U.S. Pat. Nos. 5,242,549 and 5,948,212 was reworked by a distillation, at an absolute pressure of 50–200 mbar, of a waste stream from a process to make a Ti-based catalyst for the production of polypropylene, comprising $TiCl_4$, titanium chloroalkoxide compounds, and an ester of an aromatic acid, this mixture being a brown slurry at room temperature, which further comprised 500 ml of ortho-chlorotoluene per 250 ml (393 g) of the slurry.

Per 750 ml of this mixture, a first distillation step, at a distillation temperature of 70–90° C., resulted in 200 ml of a clear, orange-red, distillate and bottoms in the form of a brown slurry.

In a second distillation step at 90–128° C., again using a pressure of 50–200 mbar, 680 g of the slurry was further separated in about 570 g of an orange-red distillate and 80 g of a tarry residue. Said residue was a very viscous mass at a temperature of 120° C. and a tar at 20° C.

Disadvantages of this procedure were, as mentioned in the description, that a partial vacuum is applied, that the tar is difficult to handle, that the waste still contained recoverable $TiCl_4$, and was to be treated as a hazardous chemical, which smoked when exposed to air.

In example 1, the same original brown slurry comprising $TiCl_4$, titanium chloroalkoxide compounds, and an ester of an aromatic acid, was subjected to a single thermal treatment step using a stirred reactor at a temperature of 210° C. at atmospheric pressure. Per 1000 g of the slurry, 469 g of an off-orange coloured distillate was obtained and 515 g of an orange/brownish powder, which was free flowing at 20° C. The powder did not emit vapours when exposed to humid air. A waste that was obtained in the same way and that was treated at a temperature of 240° C. had a flash point of 200° C.

EXAMPLES 2–6

The following samples were prepared, the number being weight percentages of the total formulation:

|  | Example | | | | |
| --- | --- | --- | --- | --- | --- |
|  | 2 | 3 | 4 | 5 | 6 |
| $TiCl_4$ | 96.5 | 93 | 47.5 | 95 | 57 |
| Ethanol | 2.5 | 5 | 3.5 | 3.5 | 2 |
| Heptane (solvent) | 0 | 0 | 0 | 0 | 40 |
| Toluene (solvent) | 0 | 0 | 47.5 | 0 | 0 |
| Ethylbenzoate (EB) | 1 | 2 | 1.5 | 0 | 0 |
| Di isobutyl phthalate (DIBP) | 0 | 0 | 0 | 1.5 | 1 |
| Weight of 270 ml of the sample | 430 | 420 | 290 | 430 | 260 |

Upon mixing the ingredients in an inert (nitrogen) atmosphere, the resulting mixture contains $TiCl_4$, various titanium chloride ethoxides (formed by reaction of $TiCl_4$ and ethanol), optional solvent, and electron donor (EB or DIBP). These mixtures are representative for the waste stream of a catalyst manufacturing process. The bottom row in the table above presents the weight of 270 ml of the mixture (in gram).

About 270 ml of the mixtures was subjected to a first step, using a 500 ml roundbottom flask with magnetic stirring bar of 4 cm length and fitted with a nitrogen sparge and a lab-scale distillation column, to which a connected condenser was fitted. In this step the temperature of the vapour was increased to 150° C. at atmospheric pressure. A first condensate was collected under nitrogen. Thereafter the bottoms of this first step were subjected to a thermal treatment at a temperature of 210–235° C., at atmospheric pressure, using the same flask and stirrer, but now just equipped with a regular condenser. A second condensate was collected under nitrogen and a particulate residue was obtained.

|  | Experiment | | | | |
| --- | --- | --- | --- | --- | --- |
|  | 2 | 3 | 4 | 5 | 6 |
| Solids (wt %) | 3.6 | 6.7 | 4.2 | 5.6 | 2.8 |
| First condensate (wt %) | 84.7 | 80.5 | 76.0 | 79.9 | 74.8 |
| Second condensate (wt %) | 6.6 | 8.3 | 15.5 | 11.3 | 17.9 |

The percentages do not add up to 100% due to the taking of samples during the process.

The solids were free flowing powders that did not emit visible vapours when exposed to moist air. The flash point of all the free flowing solids was greater than 200° C.

The invention claimed is:

1. Process to treat a waste stream comprising at least $TiCl_4$, optionally one or more conventional electron-donors, and at least one or more titanium (halo) alkoxides of the formula $TiX_x(OR)_z$ wherein X is halogen, R is alkyl, preferably lower alkyl with 1 to 10 carbon atoms, $x=0-3$, $z=1-4$, and $2 \leq x+z \leq 4$, the molecule being neutral in charge, which comprises a thermal treatment step of which the conditions are chosen such that the residue from the thermal treatment step is a final waste product in the form of particulate matter at a temperature of 20° C.

2. A process according to claim 1 wherein the thermal treatment involves a step at atmospheric pressure and a temperature of 160° C. or higher, or pressure/temperature conditions that can be equated therewith.

3. Process according to claim 2 wherein the pressure is atmospheric or higher.

4. Process according to claim 1 wherein essentially all diluent or solvent that was present in the incoming waste stream is recovered.

5. A process according to claim 1 wherein the conditions are chosen such that at least part of the titanium (halo) alkoxides is decomposed under formation of one or more Ti (halo) oxides and/or alkyl halides.

6. A process according to claim 1 wherein the conditions are chosen such that essentially all $TiCl_4$ is recovered from the waste.

7. Process according to claim 1, which comprises a conventional distillation step prior to said thermal treatment step.

8. Process according to claim 7 wherein the condensate of the thermal treatment step is recycled to the distillation step for purification.

9. Process according to claim 1 wherein the $TiCl_4$-containing distillate stream from the distillation and/or thermal treatment step is recycled to a process to make Ti-based Ziegler-Natta catalyst.

10. Process according to claim 1 wherein an alkyl halide with a boiling point below that of $TiCl_4$, that is introduced or formed in the process, is retrieved.

11. Process according to claim 1 wherein the reaction mixture is stirred, or otherwise kept in motion, during the thermal treatment step.

12. Process according to claim 1 comprising one or more further steps, in random order, selected from the group consisting of i) neutralisation and/or hydrolysis, ii) conventional oxidation, iii) incorporation of the waste into a solid matrix, iv) pyrolysis, v) pyrohydrolysis, vi) mixing with other waste materials, vii) recycling of the solid waste product to a process wherein the waste can serve as a source of Ti, and viii) dilution/combination with an appropriate diluent/agglomeration-aid.

13. Process according to claim 1 further comprising a step wherein one or more conventional (complexed) electron donors or other valuable compounds present in the final waste of the process, are recovered by a conventional technique such as hydrolysis or extraction.

* * * * *